United States Patent [19]

Loveless

[11] 3,952,774
[45] Apr. 27, 1976

[54] ELECTRICALLY OPERATED MINI-VALVE
[75] Inventor: Stanely M. Loveless, Oshtemo Township, Kalamazoo County, Mich.
[73] Assignee: General Gas Light Company, Kalamazoo, Mich.
[22] Filed: Jan. 24, 1975
[21] Appl. No.: 543,822

[52] U.S. Cl. ............................ 137/625.5; 251/129; 335/263; 335/274
[51] Int. Cl.² ........................................ F16K 11/02
[58] Field of Search .................... 137/625.5, 625.65; 251/129, 130; 335/260, 263, 274, 278

[56] References Cited
UNITED STATES PATENTS

| | | | |
|---|---|---|---|
| 2,324,642 | 7/1943 | Peterson | 335/260 |
| 2,562,392 | 7/1951 | Ray | 251/129 X |
| 2,826,215 | 3/1958 | Wolfslau et al. | 251/129 X |
| 2,930,404 | 3/1960 | Kowalski et al. | 137/625.65 |
| 2,934,090 | 4/1960 | Kenann et al. | 137/625.5 |
| 3,231,790 | 1/1966 | Vander Kaay et al. | 335/278 X |
| 3,534,770 | 10/1970 | Kowalski | 251/130 X |
| 3,540,478 | 11/1970 | Ito | 137/625.5 |
| 3,545,472 | 12/1970 | Franz | 251/130 X |
| 3,549,119 | 12/1970 | Sellers | 251/129 X |

FOREIGN PATENTS OR APPLICATIONS

| | | | |
|---|---|---|---|
| 141,867 | 12/1948 | Australia | 251/129 |
| 747,832 | 4/1956 | United Kingdom | 251/129 |
| 449,497 | 7/1949 | Italy | 251/130 |

Primary Examiner—Henry T. Klinksiek
Attorney, Agent, or Firm—Woodhams, Blanchard and Flynn

[57] ABSTRACT

There is here provided an electrically operated valve primarily for the control of a pressurized gas, such as air, and particularly adapted for manufacture in very small units. The electrical components and parts reactive thereto are so constructed and arranged that they can be made in very small sizes without excessive expense but with the resulting product being nevertheless reliable, sturdy and resistive to damage. The structural components of the operator means are held together by resilient means and the solenoid coils encircle the operating plunger and said plunger acts in one embodiment through a spring against an actuator, all such constructions being effective to eliminate the effect of construction variations. Further, there is provided a unique porting arrangement by which relatively large conduits may be attached to the valve unit, and by which, with other constructional characteristics, render the valve capable with only simple modifications to function in a variety of different modes. Lastly, the valve operator is uniquely constructed to reduce the residual magnetism which reduces the size of the return spring required and hence reduces the size of the operating solenoid. All of this reduces the size of the electrical components which still further reduces the size of the valve, renders the valve more efficient and advantageously reduces the size, complexity and expense of external control and supply apparatus.

11 Claims, 4 Drawing Figures

ELECTRICALLY OPERATED MINI-VALVE

FIELD OF THE INVENTION

This invention relates to an electrically operated valve for controlling a pressurized gas, usually air, and particularly such a valve adapted for manufacture in very small sizes without sacrificing reliability, simplicity or economy of manufacture and maintenance.

BACKGROUND OF THE INVENTION

In general, the art involving electrically operated valves for handling pressurized gases is highly developed and a large number of designs have been known for many years and have long been in successful operation. Many competing designs are available in the marketplace and such designs have been successfully modified for application to a wide variety of specific uses. This art has, however, developed primarily in connection with relatively large valves, such as valves adapted for connection to conduits of at least about ¼ inch internal diameter (⅛ NPT pipe) and arranged for supplying, for example, air cylinders of one inch in diameter and having a stroke of up to 8 inches.

However, in addition to the foregoing, there has over the past several years been developing a series of applications for electrically operated valves for controlling a pressurized gas, which valves are extremely small and are adapted for supplying a very small load, such as an air cylinder of ⅜ – ½ inch in diameter and having a stroke of up to 3 inches. Inasmuch as the cylinder to be so supplied is very small, the valve by which it is to be supplied should be correspondingly small. Nevertheless, for reasons of uniformity in design, convenient commercial availability of pipe, resistance to physical damage, and to minimize pressure drop from one end of a conduit to another, the line through which such valve and cylinder is supplied should be as large as possible and in any case seldom less than ⅛ NPT pipe (0.265 inch internal diameter and 0.406 external diameter).

While many valves have been offered to the market over the past several years for meeting these conditions, and some of them have been accepted and used, the valves previously available have at best been only partially satisfactory. Specifically, they have in general been reasonably successful in operation but they have been based on the designs of larger valves and when made in small sizes have often produced extremely awkward and consequently expensive manufacture and assembly problems and further they have often not been well adapted to accepting conduit in the minimum size above indicated. This can be readily understood when it is appreciated that the valves through which this art has primarily developed, such as a valve which has been offered to the industry for a substantial period of time under U.S. Pat. No. 3,251,378 or U.S. Pat. No. 2,912,009, wherein said valves are of the order of 4⅝ inches long by 1⅝ inches in diameter including the valve portion, create serious design problems when same are reduced to a size approximately 1 inch in diameter, or 1 inch square, and 2-3/64 inch in length.

One particularly difficult problem in the provision of valves of small sizes, related to but separate from the foregoing, is the problem of manufacturing tolerances in that tolerances which can be accepted and which present no great difficulty in the manufacture, assembly or operation of a relatively large valve have a serious and often adverse effect on the assembly and operation of a very small valve. On the other hand, to reduce the manufacturing tolerances materially will excessively increase the cost of the manufacturing operation. It is therefore necessary to arrange a small valve in such a manner that normal manufacturing tolerances can be accepted, and the variations resulting therefrom absorbed, without creating assembly or operating problems.

A further problem involved in the design of such small valves, as aforesaid, arises out of the fact that it is for some uses desirable to provide in valves of physically small size the operating characteristics of the larger valve. For example, in providing control panels for the manufacture of small articles such as semiconductors or watches, the processing machine though complex is relatively small and hence it is undesirable to have the large control system which would be required by the use of large valves. Thus, a substantial need exists and has existed for a long time for valves with a capacity and capability for use with pipe sizes characteristic of large valves but which are themselves of much smaller size and improved electrical operating specification than previously considered necessary.

A still further problem exists with previously known valves in that the magnetism remaining in the operating components following the de-energization of the solenoid winding was often such that a relatively strong spring would be required to overcome such magnetism and effect such mechanical retraction of the operator as was necessary to effect or permit corresponding shifting of the valve. Such spring then required a substantial solenoid for overcoming same upon energization thereof and this required sufficient current in-rush at the time of such energization as to make low voltage systems, as 24 volts, of doubtful reliability. Thus, it becomes highly desirable, particularly in association with the reduction in size of the valve, to provide a design which will minimize the above-mentioned residual magnetism and thereby, through making it possible to use a smaller return spring, reduce the input of energy required to actuate the valve.

Further, if a valve can be produced operable on a reduced wattage demand, for a given capacity of fluid handling, it will have obvious advantages in reducing the size of electrical components within the valve and reducing the size, complexity and expense of the external control equipment required.

Accordingly, the objects of the invention include:
1. To provide an electrically operated valve for controlling the flow of a pressurized gas, which valve will be efficient and reliable and can be economically produced in very small sizes.
2. To provide a valve, as aforesaid, which when produced in the very small sizes indicated will still be sturdy and reliable over a long period of time of high-speed repetitive operation.
3. To providde a valve, as aforesaid, of construction which, even though made in the very small sizes aforesaid, will still be economical to manufacture and efficient in operation.
4. To provide a valve, as aforesaid, which in spite of its very small size can be efficiently associated with conduits of sizes normally used for larger valves.
5. To provide a valve, as aforesaid, which in spite of its very small size will have the performance characteristics, including capacity, of previously known larger valves.

6. To provide a valve, as aforesaid, which will provide a complete internal flux path whereby to minimize flux resistance and thereby to permit increased tolerance to voltage variations.
7. To provide a valve, as aforesaid, in which the residual magnetism existing after the energization of the solenoid will be reduced from previously known valves whereby to permit the use of a smaller return spring and thereby to permit its energization with a smaller amount of energy input as compared to previously known valves of similar capacity.
8. To provide a valve, as aforesaid, which is well adapted for operating on either an a.c. or d.c. supply.
9. To provide a valve, as aforesaid, which by simple plugging of selected ports and appropriate arrangement of piping thereto can be readily caused to operate in a variety of different modes, such as normally closed two-way and/or three-way, normally open two-way and/or three-way, as a diverter valve conducting a pressure to a selected one of two different recipient systems and as a dual pressure selector valve conducting a selected one of two different pressure levels to a single recipient system.
10. To provide a valve, as aforesaid, in which all fluid lines thereto connect therewith at only one end of said valve whereby to make possible a convenient and neat connection of said valve into a fluid pressure system.

Other objects and purposes of the invention will be apparent upon examination of the accompanying drawings and reading of the following specification.

SUMMARY OF THE INVENTION

Figure 1:
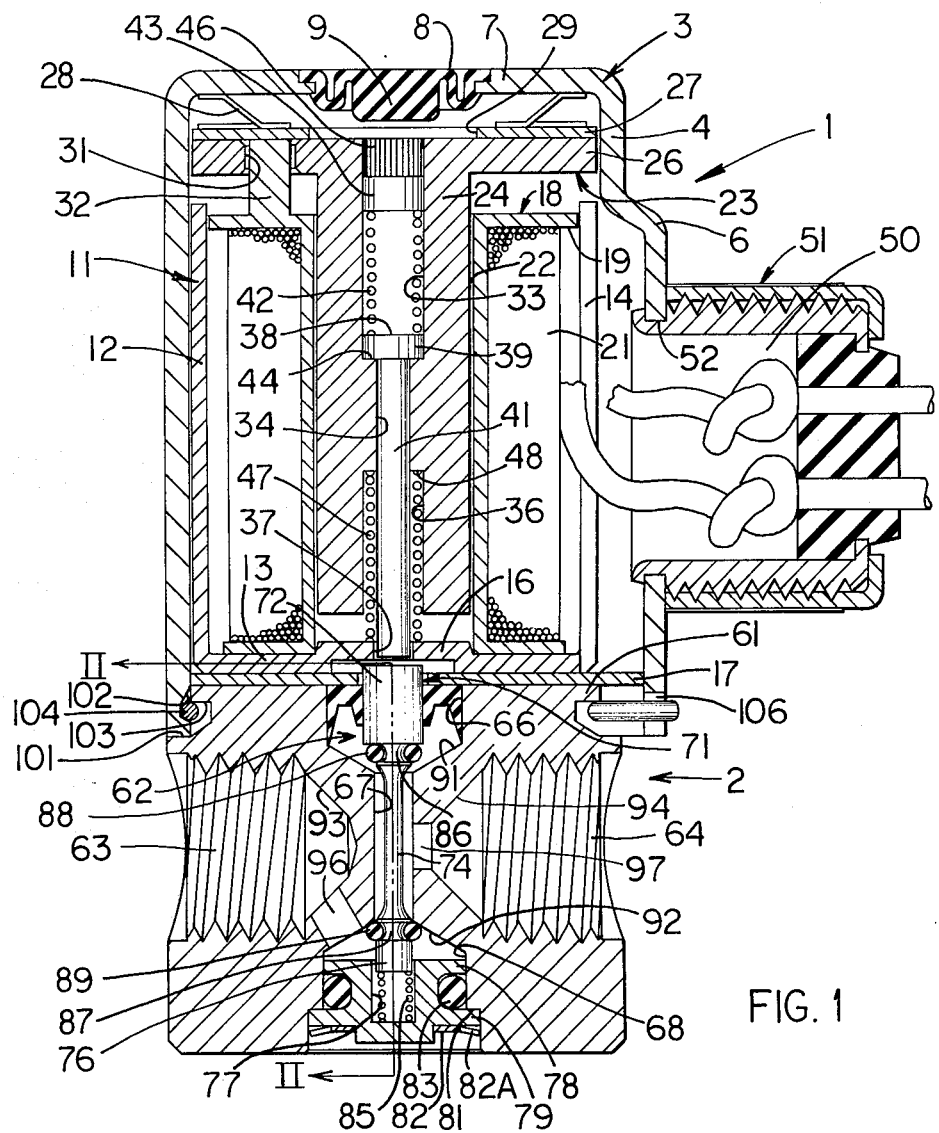
FIG. 1 is a central sectional view of a valve embodying the invention.

The invention contemplates utilizing a valve with a central axially movable plunger utilizing poppet-type valve units and valve seats with a flaring internal arrangement by which to accommodate the connection of pipes thereto, wherein the pipes are of larger size relative to the valve unit than was previously the practice in this size of valve. The invention further contemplates in one embodiment providing an actuator consisting of a centrally placed plunger operated through resilient means by a coaxially positioned telescoping second plunger which in turn is surrounded by the solenoid coils. Alternatively, if preferred for manufacturing and/or operating reasons, said resilient means may be replaced by means which are closely adjustable but otherwise fixed for obtaining more positive operating characteristics, with relatively little change in the valve components concerned. The coils themselves are arranged in a spool having a radially outwardly facing coil receiving channel which is received into a suitable cup-shaped retainer for providing a simple and compact but sturdy and reliable operating unit. Suitable means, resilient in one embodiment and adjustable in another, may as desired be arranged therein to absorb variations in manufacturing tolerances. Lastly, the valve operator is uniquely constructed to reduce the residual magnetism which reduces the size of the return spring required and hence reduces the size of the operating solenoid. All of this reduces the size of the electrical components which still further reduces the size of the valve, renders the valve more efficient and advantageously reduces the size, complexity and expense of external control and supply apparatus.

DETAILED DESCRIPTION

Turning now to the drawings for an illustration of one desirable valve embodying the invention, same comprises an operating portion 1 associated with a valve portion 2. It will be apparent as the description proceeds that while the operating portion and the valve portion are made for close cooperation with each other, the valve portion will itself operate effectively with other types of operating portions, including mechanical and pneumatic, and the operating, here electrical, portion can be used effectively with other kinds of valve portions including a diaphragm valve of the type shown in Cooksley U.S. Pat. No. 2,912,006. Nevertheless for illustrative purposes herein, these two components are shown in a normal condition of use which involves close cooperation with each other and they will be so dealt with in the following description.

Referring first to the operator portion 1, there is provided a generally cup-shaped housing 3 having generally cylindrical sides 4 excepting for the provision of an elongated bubble or protrusion 6 at one side thereof for purposes appearing further below. The housing 3 may have a generally flat top 7 or if desired there may be provided a flexible center member 8 having a somewhat thickened central portion 9 to act as a manual operator where needed as hereinafter further described.

Snugly received within said housing 3 is an upwardly opening cup-shaped spool retainer 11 having generally cylindrical sides 12 and a bottom 13 and preferably comprising a single piece of magnetically conductive material, such as iron. The sides 12 are provided with a slot 14 in one side thereof for the admission therethrough of an energizing cable and the bottom 13 is provided centrally with an upstanding offset or boss 16 for purposes appearing below. Said retainer 11 rests on a disk 17 which is supported adjacent the open end of the cup-shaped housing 3 and fixed with respect to said housing 3 by means further described below.

Immediately inside of the retainer 11 is positioned a coil carrying spool 18 having a radially outwardly facing annular recess 19 for receiving the solenoid coil 21. Said spool has a central opening 22 which is piloted at the bottom thereof on the boss 16 for centering purposes. The upper flange of said spool is fitted snugly against the inside of the sides 12 which, in cooperation with the piloting on the boss 16, holds the spool firmly as a structural part of the valve for reasons appearing below. As such structural but nonmagnetic part, it will be made from any moisture and heat resistant plastic of good structural strength, such as glass filled nylon.

A solenoid plunger 23 comprises a central portion 24 and a cap portion 26. The central portion is received coaxially within the central opening 22 of the spool 18 and is closely and firmly guided thereby and the cap portion is of a diameter only a little less than the inside diameter of the cylindrical sides 4 of the housing. Such guiding of the plunger 23 directly by the cylindrical portion of the spool 18 makes it possible to eliminate a sleeve member which is commonly used in presently known valves, thereby placing the iron of said plunger closer to the wires of the solenoid, which in turn results in a more efficient penetration of the plunger by the magnetic flux generated in the solenoid, a more efficient valve and a reduced power demand for a given level of operation.

The relative lengths of the parts are such that when the plunger 23 is in its downward position either the lower surface of the cap portion 26 or the bottom end of the central portion 24 will bottom against the upper end of the side 12 of the retainer 11 or the boss 16, respectively, according to the manner in which the tolerances work out in a given case. Since it does not matter which controls the downward movement of said plunger 23, this further indicates the adaptability of this design to tolerance variations. A washer 27 is placed immediately above and normally lies against the cap portion 26 and a resilient device which may be a Belleville spring 28 is positioned between the washer 27 and the inside of the top portion 7 of the housing 3. Where the flexible member 8 is used so that it is desired to enable the central button 9 to contact the plunger 23 directly, there will be provided a central opening 29 in the washer 27.

A plurality, such as three, openings 31 are provided through the cap portion 26 and upwardly extending tenons 32 project upwardly from the spool 18 through such openings and contact the lower surface of the washer 27. This enables said washer, which is backed by the spring 28, both to limit the upward movement of the plunger 23 and to hold the spool 18 firmly against the bottom of its retainer 11. Thus, these components are held firmly in operating relationship to each other and any dimensional variations between them within a wide tolerance limit will be absorbed by the spring 28 without adverse effect upon the operation or reliability of the unit.

The plunger 23 has a central opening therethrough which comprises an upper part 33 of a first diameter, a central part 34 of a second diameter and a bottom part 36 of a third diameter, said first and third diameters usually, though not necessarily, being the same. A further central opening 37 is provided through the boss at of the bottom of the retainer 11. An actuator 38 provided with a limiting head 39 is received within said central opening, said head 39 being receivable into the portion 33 of said central opening and the shank portion 41 being slidably received in the portion 34 of said central opening. A spring 42 in this embodiment is backed by a plug 43 and normally holds the head 39 against the shoulder 44 defined between the portion 33 and the portion 34 of said central opening. The plug 43 preferably is provided with a knurled upper portion 46 to facilitate the press fit. A spring 47 is received between the upper surface of the boss 16 and the shoulder 48 defined between the central portion 34 and the bottom portion 36 of said central opening and functions normally to urge the plunger 23 upwardly. The bottom end of the shank 41 projects through the opening 37 and upon depression of the plunger 23 will effect operation of the valve as hereinafter set forth. However, the use of the actuator 38 in association with the plunger 23 and the resilient operative connection therebetween provided by the spring 42 absorbs any dimensional variations which may exist therebetween and thereby permits the cap 26 to move solidly against the retainer 11 (or the plunger portion 24 against the boss 16) upon energizing of the solenoid coil without imposing an excessive pressure upon the part receiving the mechanical impulse from the actuator 38.

An appropriate electrical fitting 51, which may be threaded clamp means as shown or may be the end of a wire-containing conduit, is received into an opening 52 in the side of the protuberance 6 for admitting energizing wires into the housing 3, which wires are connectible to the wire coils 21. Said wires are then connected to a suitable source of energy, which latter is preferably d.c. power or suitably rectified a.c. power. The rectifier, if one is used, is preferably a full wave rectifier and may be positioned within the space 50 or anywhere outside of the clamp unit 51, as desired. In fact, while many of the aspects of the invention are applicable to a.c. energization, it will be recognized by those skilled in the art that the illustrated embodiment is specifically designed for d.c. energization, whether from a d.c. external source or from a rectifier located adjacent to or in the valve structure itself. This provides many advantages already known to the art and the adaptability of the present valve to such energization is one of the advantages thereof.

Turning now to the valve portion 2, there is provided a housing 61 having a central opening 62 therethrough and a plurality, here three, of laterally extending ports 63, 64 and 65.

Said central opening 62 has an upper portion 66 of a first diameter, a central portion 67 of a smaller diameter and a third portion 68 of a third diameter, which third diameter may be but is not necessarily the same as said first diameter. A central plunger 71 includes a first guide portion 72, same being received for support and guidance within an elastomeric grommet 73 which in turn is snugly received into the upper opening 66. Said plunger 71 then comprises a central narrow rod 74 which connects to a further guide portion 76, said latter being received in an opening 77 within a guide plug 78. Said guide plug 78 includes a flange 79 which is held against a shoulder 81 by suitable means such as a Belleville spring 82 which is in this case in turn held in place by peripheral teeth 82A thereon. O-ring 83 may, if desired, be provided to assist in closing the lower end of the portion 68 of the opening 62. A spring 85 is also received in the opening 77 and bears against the bottom end of the plunger 71 for normally urging same constantly upward.

Alternatively, if desired, the lower end of the plunger 71 may be made the same as the upper end thereof including support in a grommet similar to the grommet 73 and associated with an actuator the same as the actuator 1. With such an arrangement, the plunger 71 will then be movable one way or the other solely in response to the energization of said actuating units and without an automatic return from either position.

Said plunger 71 is also provided with circumferential grooves 86 and 87 in which are received 0-rings 88 and 89, respectively, or other convenient sealing members as desired, which bear against the valve seats formed adjacent the central opening 67 by the sloped ends 91 and 92, respectively, of the portions 66 and 68 of said central opening.

The several openings 63, 64 and 65 are terminated insofar as their full diameter is concerned at a point radially with respect to the central opening 62 outwardly of the portions 66 and 68 thereof and then project further centerward of said central opening 62 by way of the steeply slanted portions 93, 94 and 95 of each thereof. The portions 93, 94 and 95 of said opening are then connected to said central opening 62 by appropriate ports, namely the port 96 connecting the portion 93 to the portion 68 of the central opening, the port 97 connecting the portion 94 to the portion 67 of the central opening and the port 98 connecting the portion 95 to the portion 66 of the central opening 62. Particularly, it will be noted that in each case the connecting ports 96, 97 and 98 are located in the converging ends 93, 94 and 95 rather than in the threaded portions of said passageways 63, 64 and 65, respectively. Thus, the steeply slanting shape of the portions 93, 94 and 95 permits standard commercially available pipe openings 63, 64 and 65 to be relatively large without interfering with the portions 66 and 68 of the central opening, nor is there any likelihood of a pipe screwed into any of the ports 63, 64 or 65 even with normal tolerance variations in any way interfering with any of the passageways 96, 97 or 98.

The upper end of the housing 61 is provided with a recess defining a shoulder 101 for the reception thereon of the cylindrical side 4 of the operator housing 3. A groove 102 in said side 4 faces a groove 103 in the valve housing 61 for the reception of a spring pinch wire 104 by which the operator 3 may be locked onto the valve housing 61. An opening 106 is provided at the lower end of the protuberance 6 for the projection therethrough of the two ends of the pinch wire 104 by which said wire when said ends are pinched together are in a conventional manner drawn into the bottom of the groove 103 and the housing 3 of the operator thereby released. If, as is preferred, the valve housing 61, the side 4 and the wire 104 are all made circular in the plane of the wire 104, then the valve operator 3 may rotate on its axis with respect to the valve housing 61. This permits the wire entry, i.e. the protuberance 6, to be placed as desired without disturbing the positioning of the ports 63, 64 and 65. Any other conventional means for releasably positioning the operator and the valve portions in operative position with respect to each other may be adopted as desired.

OPERATION

While the operation of the foregoing apparatus has been somewhat indicated throughout the above description, same will be reviewed in further detail to insure a complete understanding of the invention.

With the valve unit 2 in the position shown in the drawings and held in such position by the spring 85 and the gas pressure on its unbalanced lower end surface of guide portion 76, the gas to be controlled, such as air under pressure, entering the inlet opening 63 will pass through the port 96 into the central opening 62 but will then be blocked by the 0-ring 89 on the valve seat 92. Simultaneously, however, gas under pressure in the load port 64 can exit through the port 97, the central opening 62 and the opening 98 to the exhaust port 65. Upon downward movement of the plunger 71 so that the 0-ring 88 contacts the valve seat 91 and the 0-ring 89 becomes spaced from the valve seat 92, the connection between the load opening 64 and the exit 65 is closed and gas can flow from the inlet 63 through the opening 96 past the valve seat 92 into the central opening 67, through the opening 97 and into the load port 64.

With the valve operator 1 in position as shown, the plate 17 rests upon the top of the valve housing 61 and the urging of the spring 28 at the top of the housing 3 acting through the washer 27 and the tenons 32 holds the spool 18 snugly against the bottom 13 of the retainer 11 and against the disk 17. With the housing 3 held by the pinch ring 104 fixedly with respect to the valve housing 61, said spring 28 is effectively backed and all portions of the valve operator are held snugly together but with sufficient resilience to absorb any dimensional variations resulting therein from normal manufacturing processes. The spring 47 holds the plunger 23 upwardly against the washer 27 and thus holds the actuator 38 away from the valve unit 71.

Upon energization of the solenoid windings 21, the solenoid will act onto the plunger 23 and pull same downwardly against the upper end of the retainer 11 or the boss 16. This acts through the spring 42 to move the actuator 38 downwardly against the valve unit 71 which pushes it downwardly against the spring 85 into the second above-described position. Any variation in spacing between the cap 26 and the upper end of the retainer 11 and between the bottom of the actuator 38 and the upper end of the valve plunger 71 when in its downward position will be absorbed by the spring 42 and thence again manufacturing variations within reasonable limits will present no difficulty.

Figure 3:
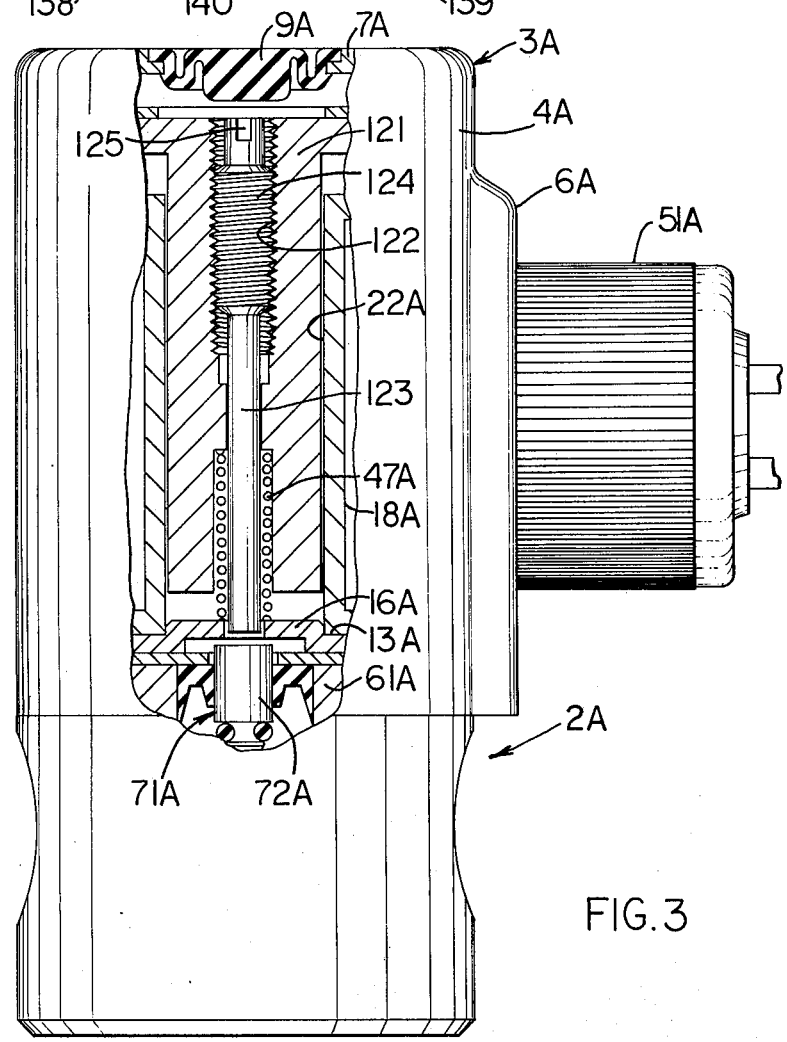
FIG. 3 is a fragmentary portion similar to the upper end of FIG. 1 illustrating a modification.

A modification is illustrated in FIG. 3 wherein it is desirable to minimize the solenoid power and hence the electrical demand of the valve but where at the same time it is possible to manufacture the valve with sufficient accuracy that the absorption of tolerance provided by the spring 42 is not required.

Figure 2:
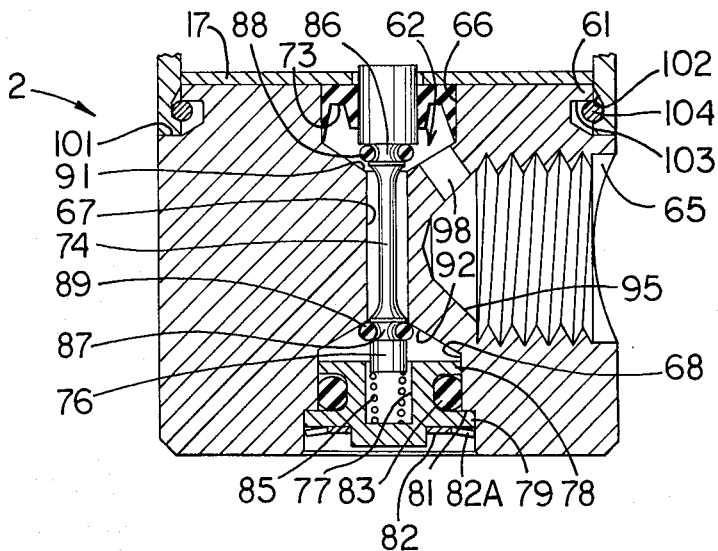
FIG. 2 is a section taken on the line II—II of FIG. 1.

In such case, all parts of the operator 1 and valve body 2 are identical to that already disclosed and described in FIGS. 1 and 2 excepting only the modification thereof illustrated in FIG. 3. Such identical parts are identified with the same numerals as above used with the addition of the letter "A" and these need no further description. New or altered parts are separately identified and described below. Here the spring 42, the plug 43 and the plunger head 39 are omitted. Plunger 121 is identical with plunger 23 excepting for tapping the opening 122 therein which latter is otherwise identical with opening 33. The plunger 123 extends into the opening 122 and is identical with plunger 41 excepting for the omission of head 39. A threaded plug 124 is screwed into said opening 122 and bears against, or is integral with, the upper end of the plunger 123. Preferably the plug 124 has a reduced upper end which is free of the threading in the hole 122 and may advantageously be provided with screw driver slot 125 to facilitate adjustment thereof. Said plug 124 is thus adjusted to position the plunger 123 at the proper location with respect to the plunger 121 to effect proper operation of the valve component upon actuation of the solenoid and resulting movement of said plunger 121 toward the valve operator 72A. It will be recognized that in this case the driving of the plunger 123 is through the plug 124 directly from the plunger 121 and proper adjustment of said plug 124 is relied upon to accommodate the valve to tolerance variations rather than the presence of the spring 42.

While the valve above shown and described has been shown and described as a three-way normally closed valve, one of its further characteristics and advantages is its capability of being converted to other operational modes by very simple alterations. For example:

1. By inserting an appropriately sized standard pipe plug into the exhaust port it can be converted into a two-way normally closed valve.
2. By attaching the pressure source to the above-described exhaust port 65, same becomes a normally open three-way valve.
3. By attaching the pressure source to the exhaust port 65 and plugging the inlet port 63, the valve becomes a normally open two-way valve.
4. By applying the pressure source to the load port 64, same becomes a diverter valve with the fluid normally flowing out of the exhaust port 65 when the operator is de-energized and flowing out of the supply port 63 when the operator is energized.
5. A dual pressure selector valve is also obtainable by connecting a first pressure source, such as 30 psi air, to the inlet 63 and a different, either higher or lower, pressure to the exhaust port 65. Thus, the exhaust port pressure is connected to the load port 64 in the de-energized position and the 30 psi pressure from the inlet 63 is supplied to the outlet port 64 when the valve is energized.

It is thus apparent that this single valve will perform a wide variety of functions with obvious economies and conveniences to the user.

Figure 4:
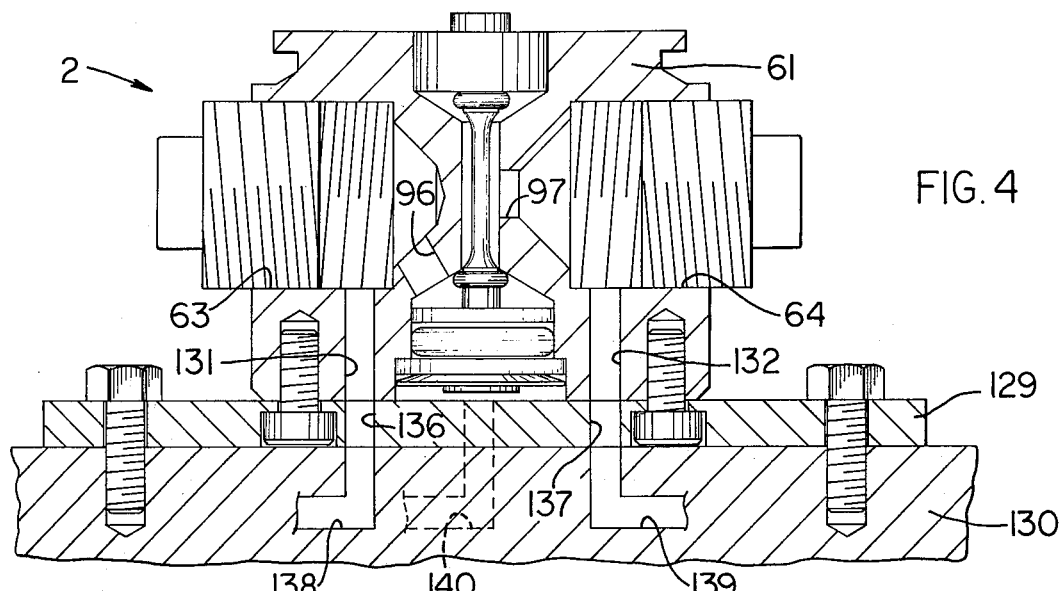
FIG. 4 illustrates a further modification.

Further, the valve is also readily adaptable to manifold use by the technique shown in FIG. 4. Here the ports 63, 64 and 65 as shown are plugged and a properly ported adapter plate 129 is fixed to the bottom of the valve portion 2, which adapter plate is in turn attachable to a manifold 130 with its ports in registry with the ports of the manifold. The passageways 131 and 132 are drilled through the bottom of the housing 61 thereby connecting the passageways 96 and 97 to the ports 136 and 137 of the adapter plate and thereby to the conduits 138 and 139 respectively of the manifold. Similar passageways, not shown, connect conduit 140 of the manifold to port 65 of the valve. This permits a rapid valve change in case of a valve malfunction without disturbing the system piping.

Still further reduction of the power required to actuate the valve and thereby the current demand thereof is accomplished by several structural features in addition to those mentioned above. Among these are the placement of the central portion 24 of the plunger 23 in close proximity to and being guided directly by the spool 18 of the solenoid, providing the housing 11 in close proximity to the solenoid for guiding the magnetic flux generated thereby and in the embodiment of FIG. 3 effecting a shortening of the stroke of the plunger 23 by the precise adjustment of adjusting screw 124.

Thus, the valve herein described fully accomplishes the above-set-forth objectives with respect to reduction of energy requirement for operation with respect to a valve of a given capacity as compared to previously known valves. This reduces the size of the electrical components required within the valve and hence still further reduces the overall size of the valve structure itself and in addition reduces the size, complexity and expense of external supply and control apparatus.

Lastly, it will be noted that all of the fluid connections to the valve are located at the same end thereof. While this is not a novel feature by itself, it is a definitely advantageous feature of the present valve in that it makes possible a more convenient and neat connection of the valve into a pressure fluid system than is possible with valves requiring connections at differing points, such as at opposite ends thereof.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In an electrically responsive valve assembly having a valve housing and an axially movable valve unit wherein one end of said valve unit is accessible from the exterior of said valve housing, the improvement comprising:

a pair of telescoped oppositely facing cup-shaped housings each having an axially elongated cylindrical sidewall, the outer of said cup-shaped housings having the free end of the sidewall thereof fixedly connected to said valve housing, and the sidewall of the inner cup-shaped housing being concentrically disposed within and axially movable relative to the sidewall of said outer cup-shaped housing;

an annular spool-shaped receptacle having an annularly arranged solenoid winding thereon, said receptacle being coaxially positioned within said inner cup-shaped housing;

the sidewall of said inner cup-shaped housing being positioned closely adjacent and in surrounding relationship to said solenoid winding throughout the axial extent thereof, said latter-mentioned sidewall being of a magnetically conductive material so as to guide the magnetic flux generated by the solenoid winding;

resilient pressure means backed against said outer cup-shaped housing and bearing against said annular receptacle for urging said receptacle against the bottom of said inner cup-shaped housing and thereby urging said inner cup-shaped housing into a limit position determined by said valve housing;

a plunger coaxially movably supported within said annular receptacle;

movable actuator means carried by said plunger for contacting and bearing against the exposed end of said valve unit when said solenoid winding is in one condition of energization or de-energization, and return means effective to urge said actuator means away from said valve unit when said solenoid winding is in the other condition of energization or de-energization.

2. The assembly of claim 1, wherein said actuator means is received within and longitudinally slidable with respect to said plunger, the end of which actuator means projects and effects contact with said valve unit and resilient means operative between said actuator means and said plunger whereby said plunger acts through said resilient means to move said actuator means toward said valve unit.

3. The assembly of claim 1, including also a cap extending radially from that end of said plunger which trails when it moves in response to solenoid winding energization, said cap extending radially at least as far as the corresponding radial position of said inner cup-shaped housing whereby the edge of said inner cup-shaped housing adjacent the open end thereof will contact said cap upon energization of said solenoid winding and limit its movement in response thereto.

4. The assembly of claim 3, wherein said return means includes resilient means bearing against a portion of said inner cup-shaped housing for constantly urging said plunger in a direction to move said cap away from said solenoid winding.

5. The assembly of claim 4, wherein said last-named resilient means acts in opposition to said resilient pressure means for urging said cap into engagement with said pressure means.

6. The assembly of claim 1, including a disk for closing the open end of the outer cup-shaped housing and interposed between the inner cup-shaped housing and the valve housing, said disk having a central opening for the extension therethrough of either or both of said valve unit and said actuator means.

7. The assembly of claim 1, including means connecting said outer cup-shaped housing to said valve housing for permitting relative rotative movement of said valve housing with respect to said outer housing while preventing separation between said housings.

8. The assembly of claim 1, wherein said valve housing has a central opening therethrough with enlarged axially spaced ends, the radially inner edges of which constitute the valve seats for alternately actuating poppet valves associated with said valve unit, and wherein at least one of a plurality of ports associated with said valve housing has a radius at least substantially equal to the spacing of said valve seats perpendicularly from the projected axis of said one port, and said one port converging to a radius on said projected axis substantially less than that between said valve seats but extending at least to a point closer to the axis of said poppet valves than the walls defining said enlarged ends.

9. The assembly of claim 1, wherein said inner cup-shaped housing, said receptacle and said plunger are all coaxial with each other, with the bottom of said inner cup-shaped housing extending across one end of said receptacle and said plunger being provided with a radially extending cap projecting across the other end of said receptacle, whereby said inner cup-shaped housing and said plunger define a flux path for magnetic flux generated by said solenoid winding which is independent of other components of the device.

10. In an electrically responsive valve assembly having a valve housing and an axially movable valve unit wherein one end of said valve unit is accessible from the exterior of said valve housing, the improvement comprising:
  an annular receptacle having an annularly arranged solenoid winding thereon;
  a pair of telescoped oppositely facing cup-shaped housings, the outer of said cup-shaped housings being fixedly related to said valve housing, and the inner of said cup-shaped housings coaxially receiving said annular receptacle;
  resilient pressure means backed against said outer cup-shaped housing and bearing against said annular receptacle for urging said latter against the bottom of said inner cup-shaped housing and thereby urging said inner cup-shaped housing to a limit determined by said valve housing;
  a plunger coaxially within said annular receptacle;
  actuator means carried by said plunger for contacting and bearing against the exposed end of said valve unit when said solenoid winding is in one condition of energization or de-energization, and return means effective to urge said actuator means away from said valve unit when said solenoid winding is in a different condition of energization;
  a cap extending radially from that end of said plunger which trails when it moves in response to solenoid energization, said cap extending radially at least as far as the corresponding radial position of said inner cup-shaped housing whereby the edge of said inner cup-shaped housing adjacent the open end thereof will contact said cap upon energization of said solenoid winding and limit its movement in response thereto, said cap also having openings therethrough; and
  tenon means extending from said annular receptacle in an axial direction to a point beyond said cap means for bearing against said pressure means, said tenon means projecting through said openings, whereby said pressure means can impose its force against said annular receptacle.

11. In an electrically responsive valve assembly having a valve housing and an axially movable valve unit wherein one end of said valve unit is accessible from the exterior of said valve housing, the improvement comprising:
  an annular receptacle having an annularly arranged solenoid winding thereon;
  a pair of telescoped oppositely facing cup-shaped housings, the outer of said cup-shaped housings being fixedly related to said valve housing, and the inner of said cup-shaped housings coaxially receiving said annular receptacle;
  said inner cup-shaped housing and said annular receptacle being coaxially centered within and by said outer cup-shaped housing, said annular receptacle having a cylindrical hollow core;
  resilient pressure means backed against said outer cup-shaped housing and bearing against said annular receptacle for urging said latter against the bottom of said inner cup-shaped housing and thereby urging said inner cup-shaped housing to a limit determined by said valve housing;
  a plunger coaxially within said annular receptacle, said plunger being coaxial with and guided within and directly by said hollow core of said annular receptacle, whereby to position said plunger in as close proximity as possible to the solenoid winding for maximizing the efficiency of transmission of magnetic flux thereto;
  actuator means carried by said plunger for contacting and bearing against the exposed end of said valve unit when said solenoid winding is in one condition of energization or de-energization, and return means effective to urge said actuator means away from said valve unit when said solenoid winding is in a different condition of energization.

* * * * *

UNITED STATES PATENT AND TRADEMARK OFFICE
CERTIFICATE OF CORRECTION

PATENT NO. : 3 952 774
DATED : April 27, 1976
INVENTOR(S) : Stanley M. Loveless

It is certified that error appears in the above-identified patent and that said Letters Patent are hereby corrected as shown below:

Please correct the inventor's name to read:

---Stanley M. Loveless---.

Signed and Sealed this

Twentieth Day of July 1976

[SEAL]

*Attest:*

RUTH C. MASON
*Attesting Officer*

C. MARSHALL DANN
*Commissioner of Patents and Trademarks*